(12) United States Patent
Kuehn et al.

(10) Patent No.: US 11,014,688 B2
(45) Date of Patent: May 25, 2021

(54) RAM AIR TURBINE ACTUATORS HAVING DAMPING

(71) Applicant: Hamilton Sundstrand Corporation, Charlotte, NC (US)

(72) Inventors: Daniel Kuehn, Roscoe, IL (US); Stephen Michael Bortoli, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 103 days.

(21) Appl. No.: 16/361,811

(22) Filed: Mar. 22, 2019

(65) Prior Publication Data

US 2020/0298992 A1 Sep. 24, 2020

(51) Int. Cl.
*B64D 41/00* (2006.01)
*F03D 9/32* (2016.01)
*F16F 9/19* (2006.01)

(52) U.S. Cl.
CPC ............ *B64D 41/007* (2013.01); *F03D 9/32* (2016.05); *F16F 9/19* (2013.01); *F05B 2220/31* (2013.01); *F05B 2260/507* (2013.01)

(58) Field of Classification Search
CPC .. B64D 41/007; F16F 9/19; F03D 9/32; F15B 21/008
See application file for complete search history.

(56) References Cited

U.S. PATENT DOCUMENTS

| 3,022,771 | A | * | 2/1962 | Chace | F16H 49/00 92/25 |
|---|---|---|---|---|---|
| 8,931,589 | B2 | | 1/2015 | Bothien et al. | |
| 10,077,118 | B2 | | 9/2018 | Bortoli et al. | |
| 10,550,867 | B2 | * | 2/2020 | Kuehn | F15B 21/045 |
| 2013/0327207 | A1 | | 12/2013 | Sasscer et al. | |
| 2015/0096437 | A1 | * | 4/2015 | Russ | B64D 41/007 92/63 |
| 2019/0003498 | A1 | | 1/2019 | Kuehn et al. | |

OTHER PUBLICATIONS

Extended European search report issued in corresponding EP application No. 19209717.8, dated Sep. 8, 2020.

* cited by examiner

*Primary Examiner* — Abiy Teka
(74) *Attorney, Agent, or Firm* — Locke Lord LLP; Daniel J. Fiorello; Scott D. Wofsy

(57) ABSTRACT

A ram air turbine (RAT) actuator piston can include a body defining a piston structure having an inner cavity. The piston can include one or more damping holes axially defined through the body to the inner cavity and a lock rod hole defined axially through the body to the inner cavity. The lock rod hole can have a larger flow area than one or more of the one or more damping holes. The lock rod hole can be configured to receive a lock rod of a RAT actuator to at least partially block flow through the lock rod hole when the lock rod is in a locked position. The one or more damping holes can be configured to allow flow through the damping holes in the locked position to allow the RAT actuator piston to move within the RAT actuator in the locked position to dissipate vibratory loads.

16 Claims, 3 Drawing Sheets

RAM AIR TURBINE ACTUATORS HAVING DAMPING

BACKGROUND

1. Field

This disclosure relates to ram air turbine (RAT) systems, more specifically to RAT actuators.

2. Description of Related Art

Due to several design constraints, a ram air turbine (RAT) in the stowed position can have a low resonance which would be excited by in flight vibratory loadings (e.g., windmilling loadings), resulting in very high loads experienced by the RAT and the RAT actuator. Low resonances can exist because as the angle of the actuator to the strut decreases, the fundamental mode of the RAT decreases resulting in very high loads. If this is in the windmilling test frequency range, it can result in a significant number of cycles at very high load.

Such conventional methods and systems have generally been considered satisfactory for their intended purpose. However, there is still a need in the art for improved RAT actuators. The present disclosure provides a solution for this need.

SUMMARY

A ram air turbine (RAT) actuator piston can include a body defining a piston structure having an inner cavity. The piston can include one or more damping holes axially defined through the body to the inner cavity and a lock rod hole defined axially through the body to the inner cavity. The lock rod hole can have a larger flow area than one or more of the one or more damping holes. The lock rod hole can be configured to receive a lock rod of a RAT actuator to at least partially block flow through the lock rod hole when the lock rod is in a locked position. The one or more damping holes can be configured to allow flow through the damping holes in the locked position to allow the RAT actuator piston to move within the RAT actuator in the locked position to dissipate vibratory loads.

The piston can include one or more lock pawl windows radially defined through the body from a radially outer surface of the body to the inner cavity, the one or more lock pawl windows configured to receive one or more lock pawls of a RAT actuator. The lock rod hole can be configured to receive a lock rod of a RAT actuator to additionally support the lock pawls when the lock rod is in a locked position.

The one or more damping holes can be defined between an axially outer face of the body and the inner cavity. The lock rod hole can be defined between the axially outer face of the body and the inner cavity. The one or more damping holes can include a plurality of damping holes. The piston can include a piston rod extending from the body forming part of or configured to connect to a rod end.

In accordance with at least one aspect of this disclosure, a ram air turbine (RAT) actuator can include an uplock mechanism defining a chamber and configured to be retained in an uplock axial position (e.g., by one or more lock pawls), and a RAT actuator piston disposed within the uplock mechanism chamber configured to dissipate vibrational energy applied to the piston in a locked position. In certain embodiments, the RAT actuator piston can be any suitable piston as disclosed herein (e.g., as described above). Any other suitable embodiment of a piston configured to dissipate vibrational energy is contemplated herein.

The RAT actuator can include one or more lock pawls disposed in the lock pawl windows. The RAT actuator can include the lock rod disposed therein and configured to move axially through the lock rod hole and to support the one or more lock pawls in the locked position to maintain the stowed position of the RAT, and to allow radially inward movement of the one or more lock pawls in an unlocked position such that the lock pawls disengage the uplock mechanism to allow extension of the RAT actuator.

The RAT actuator can include a valve housing operatively connected to the lock rod to move the lock rod axially. The RAT actuator can include at least one actuator spring configured to extend the RAT actuator in the unlocked position. The RAT actuator can include any suitable components as appreciated by those having ordinary skill in the art in view of this disclosure.

In accordance with at least one aspect of this disclosure, a ram air turbine (RAT) can include any suitable embodiment of a RAT actuator disclosed herein (e.g., as described above). Any other suitable embodiment of a RAT actuator is contemplated herein. Certain embodiments of the RAT include any other suitable components for a RAT as appreciated by those having ordinary skill in the art in view of this disclosure.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
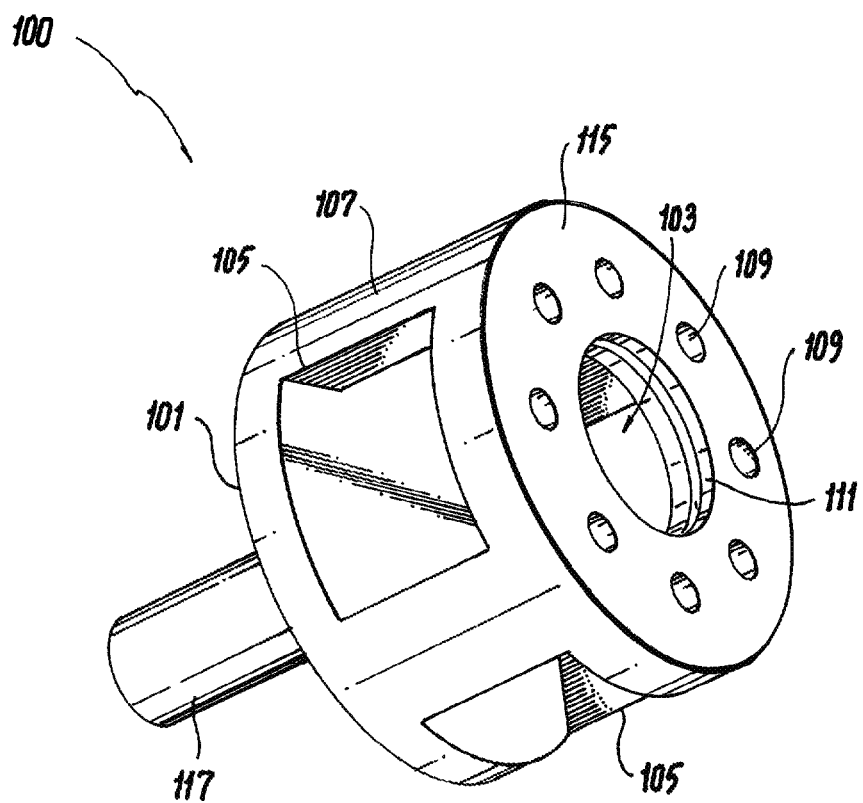
FIG. 1 is a perspective view of an embodiment of a piston in accordance with this disclosure.
Figure 2:
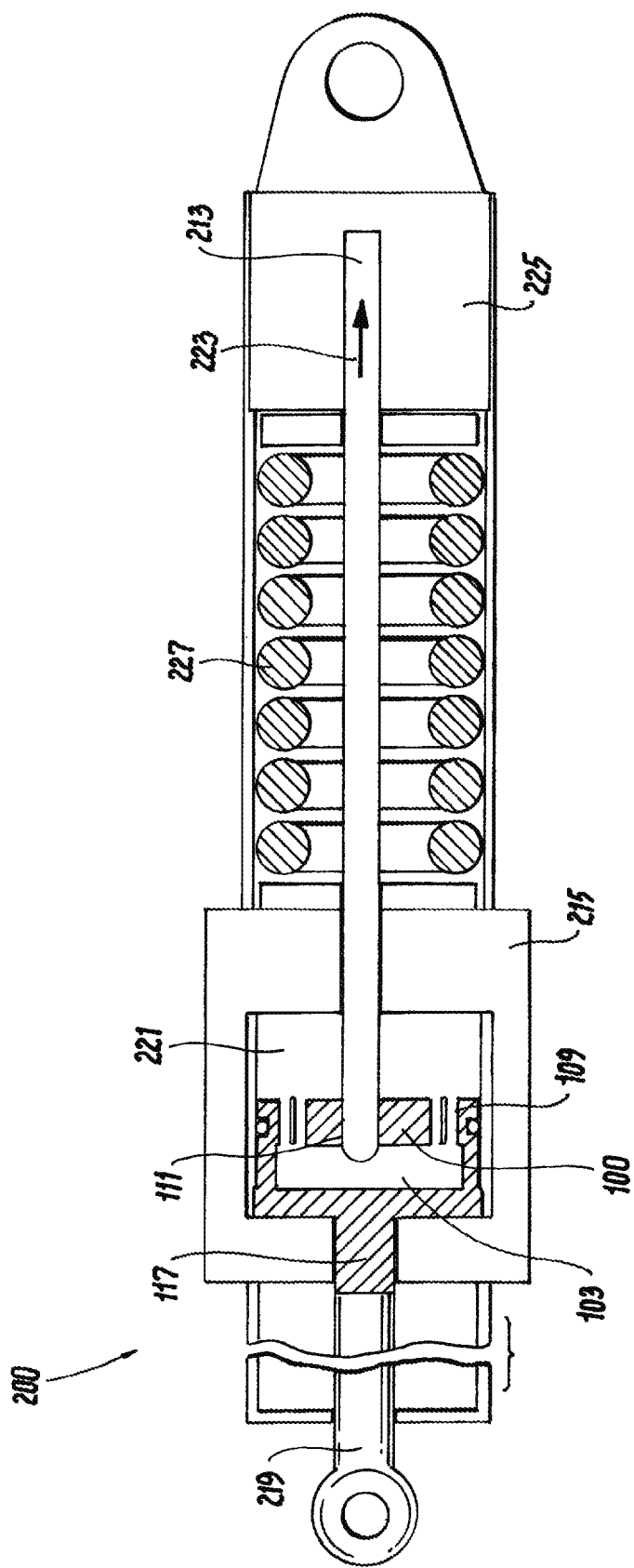
FIG. 2 is schematic cross-sectional view of an embodiment of a ram air turbine (RAT) actuator in accordance with this disclosure.
Figure 3:
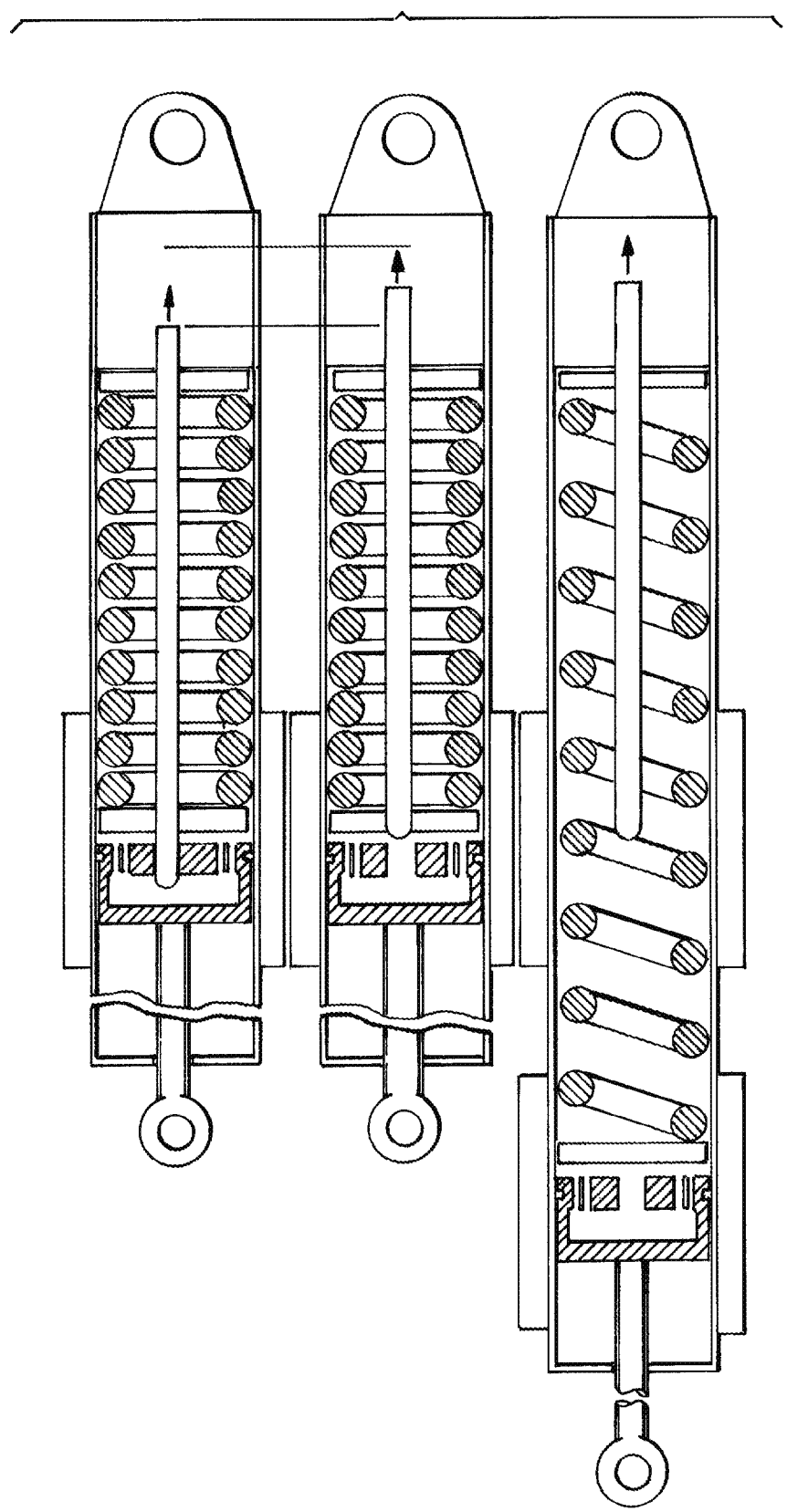
FIG. 3 is a schematic cross-sectional view of a RAT actuator showing a progression from attached to deployed.

Reference will now be made to the drawings wherein like reference numerals identify similar structural features or aspects of the subject disclosure. For purposes of explanation and illustration, and not limitation, an illustrative view of an embodiment of a ram air turbine (RAT) actuator piston in accordance with the disclosure is shown in FIG. 1 and is designated generally by reference character 100. Other embodiments and/or aspects of this disclosure are shown in FIGS. 2-3. Certain embodiments described herein can be used to dissipate vibratory loads in a RAT system in the stowed position, for example.

Referring to FIG. 1, a ram air turbine (RAT) actuator piston 100 can include a body 101 defining a piston structure (e.g., a cylindrical shape as shown, or any other suitable shape). The body 101 can have an inner cavity 103.

The piston 100 can include one or more damping holes 109 axially defined through the body 101 to the inner cavity 103 and a lock rod hole 111 defined axially through the body 101 to the inner cavity 103. The lock rod hole 111 can have a larger flow area than one or more of the one or more damping holes 109, for example. Referring additionally to FIG. 2, the lock rod hole 111 can be configured to receive a lock rod 213 of a RAT actuator 200 to at least partially block flow through the lock rod hole 111.

In certain embodiments, the piston 100 can include one or more lock pawl windows 105 configured to receive one or more lock pawls (e.g., one or more rollers, not shown) of a RAT actuator 200. The one or more lock pawl windows 105 can be radially defined through the body 101 from a radially outer surface 107 of the body 101 to the inner cavity 103. In certain embodiments, the lock rod hole 111 can be configured to receive the lock rod 213 to support the lock pawls when the lock rod 213 is in a locked position (e.g., as shown in FIG. 2) in addition to at least partially blocking flow through the lock rod hole 111.

To support the lock pawls, the lock rod 213 can extend into the cavity 103 in the locked position and contact the lock pawls to push the lock pawls radially outward to contact a surrounding uplock mechanism 215 to block the uplock mechanism 215 from moving relative to the piston 100. One having ordinary skill in the art in view of this disclosure understands that any suitable construction for the uplock mechanism 215 and lock pawls are contemplated herein. Embodiments may include lock pawls and/or the uplock mechanism dimensioned to allow some motion of the piston 100 back and forth to allow the piston to displace or travel axially a small distance relative to the uplock mechanism such that damping flow can flow through the damping holes 109 back and forth. For example, the lock pawls and/or the uplock mechanism 215 may be dimensioned to include from about 40 thousands of an inch to about 150 thousands of an inch in axial play (e.g., which is about 4 times to about 5 times as much play in existing systems).

The one or more damping holes 109 can be configured to allow flow through (back and forth when vibrating) the damping holes 109 in the locked position to allow the RAT actuator piston 100 to move within the RAT actuator 200 in the locked position to dissipate vibratory loads. The one or more damping holes 109 can include any suitable size and shape (e.g., about ⅒th the diameter of the lock rod hole 111 or any other suitable size).

As shown, the one or more damping holes 109 can be defined between an axially outer face 115 of the body 101 and the inner cavity 103. The one or more damping holes 109 can be radially positioned between the outer radial surface 107 of body 101 and the lock rod hole 111 or in any other suitable position. Similarly, the lock rod hole 111 can be defined between the axially outer face 115 of the body 101 and the inner cavity 103. Any other suitable location for the damping holes 109 and the lock rod hole 111 is contemplated herein.

The one or more damping holes 109 can include a plurality of damping holes 109 as shown (e.g., 8 or more). The piston 100 can include a piston rod 117 extending from the body 101 forming part of or configured to connect to a rod end 219. The rod end 219 can be configured to connect to the RAT.

In accordance with at least one aspect of this disclosure, as shown in FIG. 2, a ram air turbine (RAT) actuator 200 can include an uplock mechanism 215 defining a chamber 221 and configured to be retained in an uplock axial position by one or more lock pawls (not shown). The RAT actuator 200 can include a RAT actuator piston 100 disposed within the uplock mechanism chamber 221 configured to dissipate vibrational energy applied to the piston 100 in a locked position. In certain embodiments, the RAT actuator piston 100 can be any suitable piston as disclosed herein (e.g., as described above). Any other suitable embodiment of a piston configured to dissipate vibrational energy is contemplated herein.

The RAT actuator 200 can include one or more lock pawls (not shown) disposed in the lock pawl windows 105. The RAT actuator 200 can include the lock rod 213 disposed therein and configured to move axially through the lock rod hole 111 and to support the one or more lock pawls in the locked position to maintain the uplock position of the RAT. The lock rod 213 is configured to move axially out of the lock rod hole 111 (e.g., in direction 223) to allow radially inward movement of the one or more lock pawls in an unlocked position such that the lock pawls disengage the uplock mechanism 215 to allow extension of the RAT actuator 200. While certain embodiments can utilize a lock pawl type mechanism for retaining the piston, any other suitable mechanism is contemplated herein. For example, any mechanism that prevents a spring preloaded actuator from deploying is contemplated herein.

The RAT actuator 200 can include a valve housing 225 operatively connected to the lock rod 213 to move the lock rod 213 axially. Any suitable construction of the valve housing 225 is contemplated herein. The RAT actuator 200 can include at least one actuator spring 227 configured to extend the RAT actuator 200 in the unlocked position of the lock rod 213 (e.g., to deploy the RAT as appreciated by those having ordinary skill in the art). The RAT actuator 200 can include any suitable components as appreciated by those having ordinary skill in the art in view of this disclosure.

In accordance with at least one aspect of this disclosure, a ram air turbine (RAT) can include any suitable embodiment of a RAT actuator disclosed herein (e.g., as described above). Any other suitable embodiment of a RAT actuator is contemplated herein. Certain embodiments of the RAT include any other suitable components (e.g., a turbine, a shaft, a generator, etc.) for a RAT as appreciated by those having ordinary skill in the art in view of this disclosure.

Traditional systems are not capable of dissipating vibration. In certain embodiments, the RAT can include lock pawls and/or an interface thereof (e.g., in the uplock mechanism) that is dimensioned to allow the piston to vibrate, and the piston can include damper holes that allow damping of vibration of the piston thereby dissipating the vibrational energy in the fluid (e.g., hydraulic fluid) within the uplock mechanism. During the deployment process, the embodiments allow opening of the larger lock rod hole by remove of the lock rod therefrom to allow fast deployment of the piston such that both dissipation and fast deployment can be achieved.

FIG. 3, shows a stowed actuator, an actuator once a signal to deploy the actuator to deploy has been given and plunger moved to the right to open orifice and disengage locking mechanism and finally a deployed actuator.

As shown, embodiments can allow the lock rod to move (e.g., to the right as shown) to open the lock rod hole in piston to allow easy flow of fluid (e.g., oil) and to disengage lock pawls from the uplock mechanism housing to allow movement relative to the piston. The valve housing/chamber can pull the lock rod and facilitate restowing of the actuator after deployment.

Embodiments include a damper in the actuator which can damp out the low frequency response in the stowed position for HLSD (high-level-short-duration) and windmilling loading which are typically stowed only requirements. HLSD and windmilling are loadings due rotating imbalance due to loss of a fan blade on one of an aircraft's main engines. Embodiments provide play in the stowed position of the actuator such that enough damping can be provided for the specific design.

Embodiments provide damping while preventing increase in deployment time such that damping is provided in the stowed position of the RAT while not negatively impacting deployment time. For example, before the uplock mechanism is released, the flow restriction at the piston will be removed by opening the lock rod hole, thereby preventing any significant portion of the deployment spring's energy from being spent on overcoming friction. Embodiments reduce loads in the RAT and the RAT actuator leading to more robust designs, reduced weight, and reduced cost since addition of an external uplock is not necessary, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A ram air turbine (RAT) actuator piston, comprising: a body defining a piston structure having an inner cavity; one or more damping holes axially defined through the body to the inner cavity; and a lock rod hole defined axially through the body to the inner cavity, wherein the lock rod hole has a larger flow area than one or more of the one or more damping holes, wherein the lock rod hole is configured to receive a lock rod of a RAT actuator to at least partially block flow through the lock rod hole when the lock rod is in a locked position, wherein the one or more damping holes are configured to allow flow through the damping holes in the locked position to allow the RAT actuator piston to move within the RAT actuator in the locked position to dissipate vibratory loads.

2. The piston of claim 1, further comprising one or more lock pawl windows radially defined through the body from a radially outer surface of the body to the inner cavity, the one or more lock pawl windows configured to receive one or more lock pawls of a RAT actuator, wherein the lock rod hole is configured to receive a lock rod of a RAT actuator to additionally support the lock pawls when the lock rod is in a locked position.

3. The piston of claim 1, wherein the one or more damping holes are defined between an axially outer face of the body and the inner cavity.

4. The piston of claim 3, wherein the lock rod hole is defined between the axially outer face of the body and the inner cavity.

5. The piston of claim 4, further comprising a piston rod forming part of or configured to connect to a rod end extending from the body.

6. The piston of claim 1, wherein the one or more damping holes includes a plurality of damping holes.

7. A ram air turbine (RAT) actuator, comprising: an uplock mechanism defining a chamber and configured to be retained in an uplock axial position; and a RAT actuator piston disposed within the uplock mechanism chamber configured to dissipate vibrational energy applied to the piston in a locked position; wherein the RAT actuator piston includes: a body defining a piston structure having an inner cavity; one or more lock pawl windows radially defined through the body from a radially outer surface of the body to the inner cavity, the one or more lock pawl windows configured to receive one or more lock pawls of a RAT actuator; one or more damping holes axially defined through the body to the inner cavity; and a lock rod hole defined axially through the body to the inner cavity, wherein the lock rod hole has a larger flow area than one or more of the one or more damping holes, wherein the lock rod hole is configured to receive a lock rod of a RAT actuator to at least partially block flow through the lock rod hole and support the lock pawls when the lock rod is in a locked position, wherein the one or more damping holes are configured to allow flow through the damping holes in the locked position to allow the RAT actuator piston to move within the RAT actuator in the locked position to dissipate vibratory loads.

8. The RAT actuator of claim 7, further comprising the one or more lock pawls disposed in the lock pawl windows.

9. The RAT actuator of claim 8, further comprising the lock rod disposed therein and configured to move axially through the lock rod hole and to support the one or more lock pawls in the locked position to maintain the uplock position of the RAT, and to allow radially inward movement of the one or more lock pawls in an unlocked position such that the lock pawls disengage the uplock mechanism to allow extension of the RAT actuator.

10. The RAT actuator of claim 9, further comprising a valve housing operatively connected to the lock rod to move the lock rod axially.

11. The RAT actuator of claim 10, further comprising at least one actuator spring configured to extend the RAT actuator in the unlocked position.

12. A ram air turbine (RAT), comprising: a RAT actuator having an uplock mechanism defining a chamber and configured to be retained in an uplock axial position, and a RAT actuator piston disposed within the uplock mechanism chamber configured to dissipate vibrational energy applied to the piston in a locked position, wherein the RAT actuator piston includes: a body defining a piston structure having an inner cavity; one or more lock pawl windows radially defined through the body from a radially outer surface of the body to the inner cavity, the one or more lock pawl windows configured to receive one or more lock pawls of a RAT actuator; one or more damping holes axially defined through the body to the inner cavity; and a lock rod hole defined axially through the body to the inner cavity, wherein the lock rod hole has a larger flow area than one or more of the one or more damping holes, wherein the lock rod hole is configured to receive a lock rod of a RAT actuator to at least partially block flow through the lock rod hole and support the lock pawls when the lock rod is in a locked position, wherein the one or more damping holes are configured to allow flow through the damping holes in the locked position to allow the RAT actuator piston to move within the RAT actuator in the locked position to dissipate vibratory loads.

13. The RAT of claim 12, further comprising the one or more lock pawls disposed in the lock pawl windows.

14. The RAT of claim 13, further comprising the lock rod disposed therein and configured to move axially through the lock rod hole and to support the one or more lock pawls in the locked position to maintain the uplock position of the RAT, and to allow radially inward movement of the one or more lock pawls in an unlocked position such that the lock pawls disengage the uplock mechanism to allow extension of the RAT actuator.

15. The RAT of claim 14, further comprising a valve housing operatively connected to the lock rod to move the lock rod axially.

16. The RAT of claim 15, further comprising at least one actuator spring configured to extend the RAT actuator in the unlocked position.

\* \* \* \* \*